Figure 1:
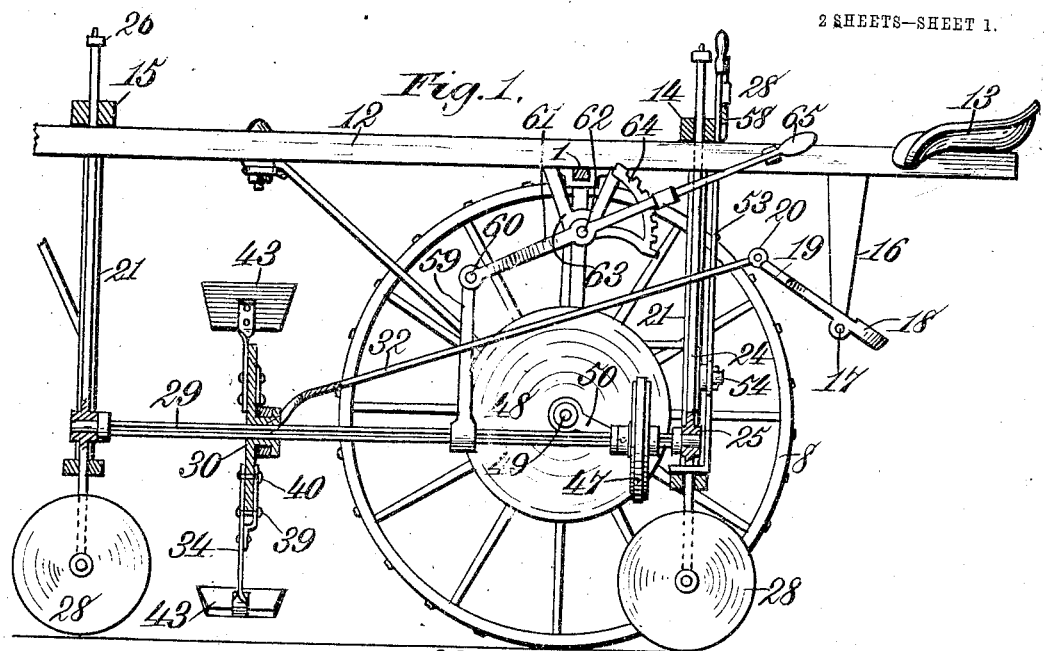

No. 872,787. PATENTED DEC. 3, 1907.
J. C. BELL.
COTTON CHOPPER.
APPLICATION FILED JULY 22, 1907.

2 SHEETS—SHEET 1.

Witnesses.
Robert Everett,
H. B. Keefer

Inventor.
John C. Bell.
By James L. Norris
Atty.

No. 872,787. PATENTED DEC. 3, 1907.
J. C. BELL.
COTTON CHOPPER.
APPLICATION FILED JULY 22, 1907.
2 SHEETS—SHEET 2.
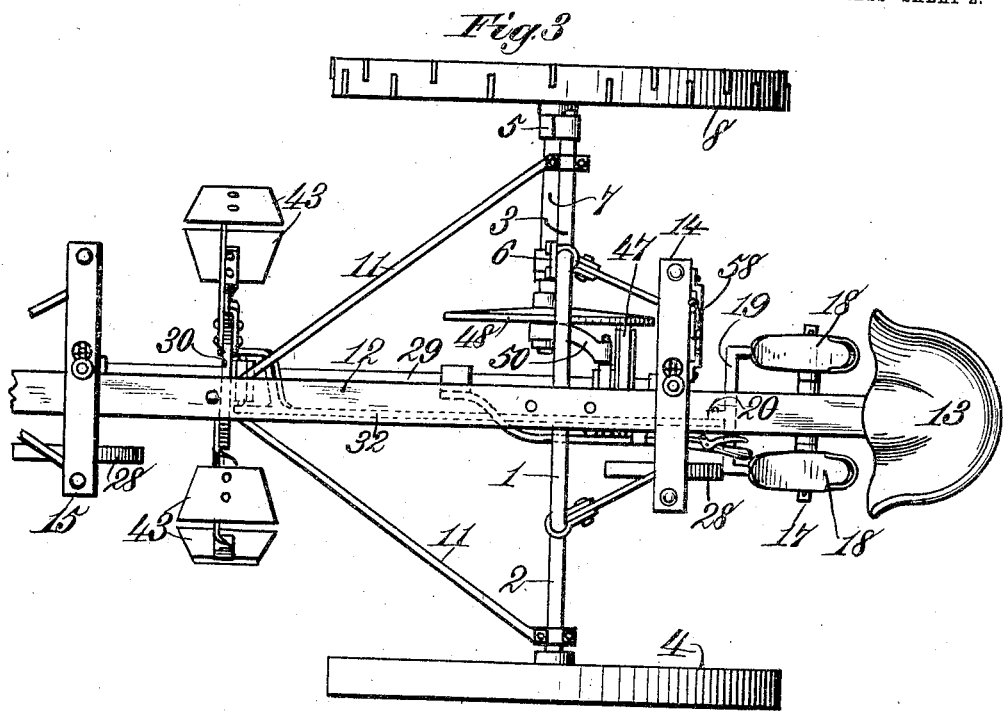
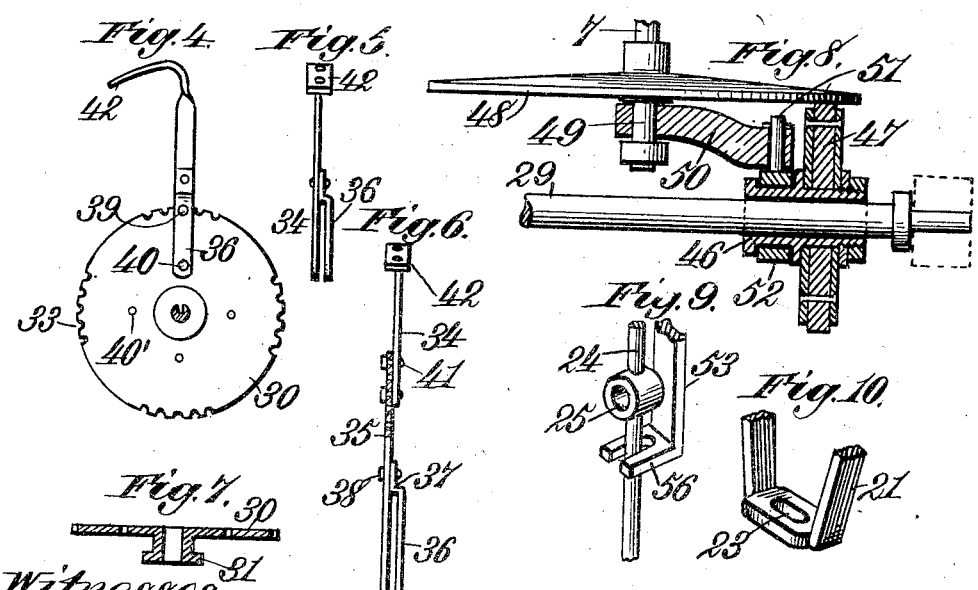
Witnesses.
Robert Everitt,
Inventor.
John C. Bell,
By
James L. Norris
Atty.

UNITED STATES PATENT OFFICE.

JOHN C. BELL, OF CARTERSVILLE, GEORGIA, ASSIGNOR OF ONE-HALF TO NICHOLAS M. ADAMS, OF CARTERSVILLE, GEORGIA.

COTTON-CHOPPER.

No. 872,787.

Specification of Letters Patent.

Patented Dec. 3, 1907.

Application filed July 22, 1907. Serial No. 384,936.

*To all whom it may concern:*

Be it known that I, JOHN C. BELL, a citizen of the United States, residing at Cartersville, in the county of Bartow and State of Georgia, have invented new and useful Improvements in Cotton-Choppers, of which the following is a specification.

This invention relates to cotton choppers, and the object thereof is to provide a machine of such class in a manner as hereinafter set forth, with means for adjusting the knives in a longitudinal direction with respect to the machine so as to prevent the knives meeting with an obstruction and further to enable the chopping of the plants at varying distances apart when occasion so requires.

Further objects of the invention are to provide the machine with means as hereinafter set forth for adjusting the knives to regulate the cut, to set the knives at the desired angle, and further to provide means whereby the knives can be elevated to clear the ground.

A further object of the invention is to provide a machine of such class in a manner as hereinafter set forth with a frictional gearing for driving the knife shaft and to so connect the driven disk with the shaft of the driving disk as to always position the driven disk at the same point from the edge of the driving disk so that the operation of the knife shaft will be uniform or be driven at the same rate of speed, whether the knife shaft be elevated or lowered.

Further objects of the invention are to provide a cotton chopper which shall be simple in its construction, strong, durable, efficient in its use, readily set up, and comparatively inexpensive to manufacture.

With the foregoing and other objects in view, the invention consists in the novel construction, combination and arrangement of parts hereinafter more specifically described and illustrated in the accompanying drawings wherein is shown the preferred embodiment of the invention, but it is to be understood that changes, variations and modifications can be resorted to which come within the scope of the claims hereunto appended.

In describing the invention in detail, reference is had to the accompanying drawings, wherein like reference characters denote corresponding parts throughout the several views and in which:—

Figure 2:
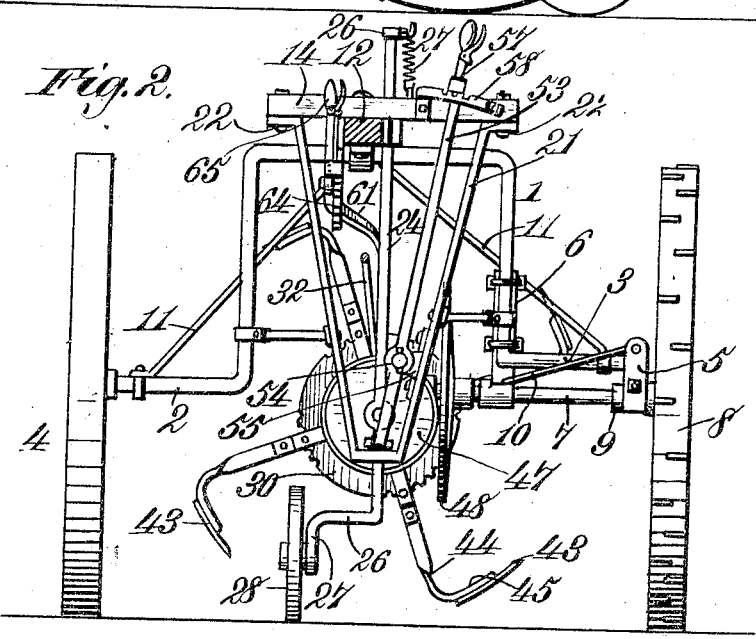

Figure 1 is a longitudinal sectional view of a cotton chopper in accordance with this invention. Fig. 2 is an end view. Fig. 3 is a top plan. Figs. 4, 5, 6 and 7 are details of the connecting and adjusting means for the knives. Fig. 8 is a sectional plan of the frictional gearing. Fig. 9 is a detail of a portion of one of the vertically adjustable supporting rods for the knife shaft, and Fig. 10 is a detail showing the end of one of the retaining frames.

Referring to the drawings by reference characters, 1 denotes an arched axle, the end 2 thereof being below the plane of the end 3. The end 2 has mounted thereon a wheel 4. The end 3 carries a hanger 5 and a hanger 6 is suspended from the body portion of the axle 1. Journaled in the hangers 5, 6 is a drive shaft 7 which is fixed to the wheel 8 and rotated thereby. Collars 9 are provided to limit the lateral movement of the shaft 7. The brace member 10 connects the hangers 5, 6. Brace members 11 connect the ends 2, 3 of the arched axle with the tongue 12 of the machine which projects forwardly and rearwardly of and is mounted upon the top of the axle 1. At the rear of the tongue 12 a seat 13 is provided. Forwardly of the seat 13 a cross member 14 is mounted upon and secured to the tongue 12. Forwardly of the wheels 4, 8 and secured to the tongue 12 a cross member 15 is provided. Depending from the tongue 12 forwardly of the seat 13 is a hanger 16 in which is journaled a shaft 17 carrying a pair of foot treads 18 connected together at their forward end by the yoke piece 19 having a pair of forwardly projecting lugs 20.

Depending from each of the cross members 14 and 15 is a retaining frame, each of said frames consisting of V-shaped members 21 fixed at their upper ends as at 22 to its respective member and having its lower end formed with an opening 23 through which extends a supporting rod 24 having a journal box 25. Each of the rods 24 at its lower end is bent in an angular manner as at 26 and then downwardly as at 27 and to said end 27 is attached a gage wheel 28. The rods 25 at their upper ends extend through the cross members 14, 15 and have enlarged upper ends as at 26. Attached to the end 26 and to the cross member is a compression spring 27, there being a compression spring for the upper end of each of the rods. These springs 27 form a cushioning support for the rods 24 and also tend to retain the gage wheels in engagement with the ground. The rods 24 are vertically shiftable through the members 14 and 15, while that rod 24 which extends through the cross member 14 is capable of having a slight lateral movement at its lower end. Provision for such movement is made by having the opening 23 through which the rod extends somewhat enlarged. The function of the slight rearward movement of the upper end of the rod will be hereinafter referred to.

Journaled in the box 25 is a longitudinally extending knife shaft 29 which carries a notched disk 30 capable of being longitudinally shifted upon the shaft 29, but so connected with said shaft 29 that it will rotate therewith. The disk 30 is formed with a flanged collar 31 engaged by the forward end of the lever arm 32, the rear end of said lever arm 32 being pivotally connected to the lugs 20. By such construction, it is evident that if the forward portions of the foot treads 18 are lowered, the disk 30 will be moved forward on the shaft 29 and a reverse movement of the disk 30 is had if the forward portions of the foot treads resume their normal or elevated position. By such an arrangement the disk which carries the knives can be shifted so that the knives will be moved out of the path of an obstruction or the knives can be positioned so that the distance between the plants chopped can be varied. The notches of the disk 30 are indicated by the reference character 33. To the disk 30 is attached a plurality of adjustable knife carrying arms which as shown in Fig. 6 are formed of three sections 34, 35 and 36. The section 36 is provided with an angular end 37 which is secured as at 38 to the section 35. By such construction the arm when in position straddles the disk 30 which is clearly shown in Fig. 1. Extending through the sections 35, 36 are the hold-fast devices 39, 40. The latter extends through the disk 30, openings 40' being provided for such purpose. The hold-fast device 40 thereby connects the arm to the disk. The hold-fast device 39 is adapted to engage in the notches 33 so as to retain the angular adjustment of the arm with respect to the disk. By providing a plurality of notches 33, it is evident that the knife-carrying arm can be adjusted to extend at varying angles with respect to the disk 30. The section 35 is adjustably connected to the section 34 by the hold-fast device 41 and by such an arrangement the length of the arm can be increased or decreased when occasion so requires. The section 34 is provided with a seat 42 to which is secured the knife 43. The section 34 is twisted as at 44, and also extends in an angular manner as at 45 (see Fig. 2) and by such structure the knives 43 when connected to the arms have their edges extending in a longitudinal direction so that the knives will operate transversely with respect to the machine. In Fig. 5 the arms are not shown adjustable and in this connection it will be stated that the section 36 is attached to the section 34, the latter being somewhat elongated, otherwise than that as stated the knife carrying arm in Fig. 5 is the same as that shown in Fig. 6.

The shaft 29 is rotated through the medium of a frictional gearing and in this connection it will be said that upon the shaft 29 is mounted a sleeve 46 carrying a driven disk 47 which frictionally engages with one side of a driving disk 48 mounted upon the inner end of the shaft 7. The shaft 7 projects from one side of the driving disk 48 as at 49 and has loosely mounted on said projecting end a radius bar 50 which is pivotally connected to a pin 51 carried by a collar 52 mounted upon the sleeve 46. The latter is longitudinally slidable upon the shaft 29 but rotates therewith. The radius bar 50 has that end which is mounted upon the projecting end 49 of the shaft, of less width than the length of said projecting end. By such an arrangement the said end of the radius bar 50 which is mounted upon the projecting end 49 can have a slight longitudinal play thereon when the shaft 29 is shifted to move the disk 47 from engagement with the disk 48 in a manner as hereinafter referred to. The function of the radius bar 50 is to retain the disk 47 in engagement with the disk 48 in the same position at all times in case the shaft 29 is vertically adjusted, and by such arrangement the same rate of speed of the shaft 29 is always had. The bar 50 is removably connected to the shaft 49 and pin 51 so as to enable the setting up of radius bars of varying lengths. If the bar is shorter than that shown, the disk 47 will engage the disk 48 nearer the axis of the latter, consequently the speed of the disk 47 will be less than what it is in the position shown in Fig. 8. If the disk 47 is moved closer to the edge of the disk 48, an elongated radius arm 50 being provided for such purpose, the speed of the disk 47 will be greater than what it is in the position shown in Fig. 8. By such an arrangement, it is evident that the shaft 29 can be rotated at varying rates of speeds.

The disk 47 is moved out of engagement with the disk 48 through the medium of a shifting lever 53 which is pivoted as at 54 to a lug 55 projecting over one of the arms of that frame 21 secured to the cross member 14. The lower end of the lever 53 is provided with a fork 56 which straddles that rod 24 arranged at the rear of the machine. Now if the lever 53 be shifted upon its pivot in one direction, the bar 24 will be carried therewith, consequently moving the disk 47 from engagement with the disk 48 and the sliding of the collar 52 longitudinally upon the shaft 29. The lever 53 when shifted is retained in such position through the medium of a dog 57 engaging in the rack 58 carried by the member 14. The disk 47 can be brought into operative position with respect to the disk 48 by releasing the lever 53 and shifting the latter in an opposite direction. The disk is retained in such position owing to the engagement of the pawl or dog 57 with the rack 58.

The shaft 29 is vertically adjusted by means of a link 59 engaging the lower end of the shaft 29 and pivotally connected as at 60 to the forward end of a hand-operated lever 61. The lever 61 is pivoted as at 62 to a hanger 63 depending from the tongue 12. To the hanger 63 is attached a rack 64 with which engages a dog carried by the lever 61 so as to maintain the lever 61 in the position set. The lever 61 projects rearwardly and is provided with a handle 65 arranged in such position that it can be readily grasped by the driver of the machine.

The lever 61 and its connections with the shaft 29 provide means whereby the shaft 29 can be vertically adjusted so as to elevate the knives to an inoperative position and further provides means to allow of the knives passing over obstructions. When the shaft 29 is vertically adjusted, the bars 24 are carried therewith, but the upward movement of the bars 24 is had against the pull of the springs 27.

The wheels 28 not only act as gages but also act as supports and are so positioned as to travel at one side of the plants. This arrangement is had owing to the providing of the lower end of the rod 24 in an angular manner so that the wheels will not be positioned in alinement with the shaft 29.

From the foregoing construction and arrangement of parts, it is evident that when the machine travels, the shaft 7 will be rotated carrying the disk 48 therewith and it will be assumed that the disk 47 is in engagement with the disk 48. As the disk 48 revolves, like motion will be imparted to the disk 47 which in turn will rotate the shaft 29, the latter carrying the disk 30 therewith, and revolve the knives so that they will perform their function, i. e. chopping the cotton. It will be assumed that the shaft 29 has been lowered so that the knives will be so positioned as to enable them to chop the plant during the rotation of the shaft. If while the machine is traveling it is desired to project the knives forwardly upon the shaft 29 so that during the rotation of the knives they will not engage with an obstruction, the forward portions of the treads 17 are lowered, which shifts the lever 32 forwardly and the latter in turn will carry the disk 40 therewith; thereby positioning the knives forward of the shaft 29. If it be desired to elevate the knives, all that is necessary to do is for the operator to lower the handle end 65 of the lever 61, such action elevating the link 59 which in turn will carry the shaft 29 therewith. If it be desired to discontinue the operation of the shaft 29, the lever 53 is shifted towards the wheel 8 and by such action the lower end of the lever 53 will shift that rod 24 which is arranged at the rear of the machine away from the disk 48 which in turn will move the disk 47 out of operative engagement with the disk 48 and thereby discontinue the operation of the shaft 29 and the knives 43.

What I claim is:—

1. A cotton chopper comprising a rotatable knife shaft, a plurality of lengthwise and angularly-adjustable knife-carrying arms mounted upon the shaft and rotated thereby, a knife secured to the arms, means for adjusting said arms longitudinally of the shaft at the rotation of the knives, a driving disk, an operating shaft therefor, a driven disk mounted upon said rotatable knife shaft and adapted to engage with the driving disk, and a radius bar connected with said operating shaft and with said driven disk for maintaining the driven disk permanently at a predetermined position with respect to the axis of the driving shaft.

2. A cotton chopper comprising a rotatable knife shaft, a plurality of lengthwise and angularly adjustable knife-carrying arms mounted upon the shaft and rotated thereby, a knife secured to the arms, means for adjusting said arms longitudinally of the shaft during the rotation of the knives, a driving disk, an operating shaft therefor, a driven disk mounted upon said rotatable knife shaft and adapted to engage with the driving disk, a radius bar connected with said operating shaft and with said driven disk for maintaining the driven disk permanently at a predetermined position with respect to the axis of the driving shaft, and means engaging with the rear end of said knife shaft for shifting the driven disk out of engagement with the driving disk and causing thereby the shifting of the driving disk upon the knife shaft.

3. A cotton chopper comprising a rotatable knife shaft, a plurality of knives carried and rotated by said shaft, means for longitudinally adjusting said knives upon said shaft during the operation of the knives, a longitudinally slidable rotatable disk mounted upon and engaging with the said shaft for operating it, and a driving disk engaging with said driven disk for rotating it means for elevating said shaft; and means connected with the driven disk and with said shaft for retaining the driven disk at the same distance from the axis of the driving disk when the shaft is elevated.

4. A cotton chopper comprising a rotatable knife shaft, a plurality of length-wise and angularly adjustable knife carrying arms mounted upon the shaft and rotated thereby, knives secured to the arms, means for adjusting said arms longitudinally of the shaft during the rotation of the knives, a longitudinally slidable and rotatable disk mounted upon and engaging with the said shaft for operating it, a driving disk engaging with said driven disk for rotating it means for elevating said shaft, and means connected with the driven disk and with said shaft for retaining the driven disk at the same distance from the axis of the driving disk when the shaft is elevated.

5. A cotton chopper comprising a rotatable knife shaft, a plurality of knives carried and rotated by said shaft, means for longitudinally adjusting said knives upon said shaft during the operation of the knives, and a link and lever mechanism connected with said shaft for vertically adjusting it.

6. A cotton chopper comprising a rotatable knife shaft, a plurality of lengthwise and angularly adjustable knife carrying arms mounted upon the shaft and rotated thereby, knives secured to the arms, means for adjusting said arms longitudinally of the shaft during the rotation of the knives, and a link and lever mechanism connected with said shaft for vertically adjusting it.

7. A cotton chopper comprising a rotatable knife shaft, a plurality of knives carried and rotated by said shaft, means for longitudinally adjusting said knives upon said shaft during the operation of the knives, a longitudinally slidable and rotatable disk mounted upon and engaging with the said shaft for operating it, a driving disk engaging with said driven disk for rotating it, and means engaging with said shaft for moving said driven disk out of operative engagement with said driving disk.

8. A cotton chopper comprising a rotatable knife shaft, a plurality of lengthwise and angularly adjustable knife carrying arms mounted upon the shaft and rotated thereby, knives secured to the arms, means for adjusting said arms longitudinally of the shaft during the rotation of the knives, a longitudinally slidable and rotatable disk mounted upon and engaging with the said shaft for operating it, a driving disk engaging with said driven disk for rotating it, and means engaging with one end of said shaft for moving said driven disk out of operative engagement with said driving disk.

9. A cotton chopper comprising a rotatable knife shaft, a plurality of knives carried and rotated by said shaft, means for longitudinally adjusting said knives upon said shaft during the operation of the knives, a longitudinally slidable and rotatable disk mounted upon and engaging with the said shaft for operating it, a driving disk engaging with said driven disk for rotating it, means for moving said driven disk out of operative engagement with said driving disk, and means for vertically adjusting said shaft whereby said driving disk is shifted longitudinally upon said shaft.

10. A cotton chopper comprising a rotatable knife shaft, a plurality of lengthwise and angularly adjustable knife carrying arms mounted upon the shaft and rotated thereby, knives secured to the arms, means for adjusting said arms longitudinally of the shaft during the rotation of the knives, a longitudinally slidable and rotatable disk mounted upon and engaging with the said shaft for operating it, a driving disk engaging with said driven disk for rotating it, means for moving said driven disk out of operative engagement with said driving disk, and means for vertically adjusting said shaft whereby said driving disk is shifted longitudinally of said shaft.

11. A cotton chopper comprising a rotatable knife shaft, a rotatable notched disk longitudinally shiftable upon said shaft, a plurality of lengthwise adjustable knife-carrying arms pivotally connected with the disk, means carried by the arms and engaging in the notches of the disk for disposing said arms in an angular position with respect to the axis of the disk, and means for shifting said disk upon said shaft.

12. A cotton chopper comprising a rotatable knife shaft, a rotatable notched disk longitudinally shiftable upon said shaft, a plurality of lengthwise adjustable knife-carrying arms pivotally connected with the disk, and means carried by the arms and engaging in the notches of the disk for disposing said arms in an angular position with respect to the axis of the disk.

13. A cotton chopper comprising a rotatable knife shaft, a plurality of knives carried and rotated by said shaft, means for longitudinally adjusting said knives upon said shaft during the operation of the knives, a longitudinally slidable and rotatable disk mounted upon and engaging with the said shaft for operating it, a driving disk engaging with said driven disk for rotating it, an operating shaft for the driving disk, a radius bar connected with said operating shaft and with said driven disk, and a pair of vertically movable and cushioned supporting rods for said shaft.

14. A cotton chopper comprising a rotatable knife shaft, a plurality of lengthwise and angularly adjustable knife carrying arms mounted upon the shaft and rotated thereby, knives secured to the arms, means for adjusting said arms longitudinally of the shaft during the rotation of the knives, a longitudinally slidable and rotatable disk mounted upon an operating shaft for the driving disk, and a radius bar loosely mounted at one end upon said shaft and pivotally connected at its other end with said driven disk and engaging with the said shaft for operating it, a driving disk engaging with said driven disk for rotating it, and a pair of vertically movable and cushioned supporting rods for said shaft.

15. A cotton chopper comprising a rotatable knife shaft, a plurality of knives carried and rotated by said shaft, means for longitudinally adjusting said knives upon said shaft during the operation of the knives, and a pair of vertically movable cushioned supporting rods for said shaft, each of said rods having an angular lower end and an engaging wheel connected to the angular end of each of the rods.

16. A cotton chopper comprising a rotatable knife shaft, a plurality of lengthwise and angularly adjustable knife carrying arms mounted upon the shaft and rotated thereby, knives secured to the arms, means for adjusting said arms longitudinally of the shaft during the rotation of the knives, and a pair of vertically movable cushioned supporting rods for said shaft, each of said rods having an angular lower end and an engaging wheel connected to the angular end of each of the rods.

17. A cotton chopper comprising a rotatable knife shaft, a plurality of knives carried and rotated by said shaft, means for longitudinally adjusting said knives upon said shaft during the operation of the knives, a longitudinally adjustable and slidable disk mounted upon and engaging with the said shaft for operating it, a driving disk engaging with said driven disk for rotating it, means for elevating said shaft causing thereby the shifting of the driven disk in a longitudinal direction and a pair of vertically movable and cushioned supporting rods for said shaft, each of said rods having an angular lower end and an engaging wheel connected to the angular end of each of the rods.

18. A cotton chopper comprising a rotatable knife shaft, a plurality of lengthwise and angularly adjustable knife carrying arms mounted upon the shaft and rotated thereby, knives secured to the arms, means for adjusting said arms longitudinally of the shaft during the rotation of the knives, a longitudinally slidable and rotatable disk mounted upon and engaging with the said shaft for operating it, a driving disk engaging with said driven disk for rotating it, and a pair of vertically movable and cushioned supporting rods for said shaft, each of said rods having an angular lower end and an engaging wheel connected to the angular end of each of the rods.

In testimony whereof I have hereunto set my hand in presence of two subscribing witnesses.

JOHN C. BELL.

Witnesses:
 H. A. BLEEK,
 W. M. ADAMS.